United States Patent
Morgan et al.

(10) Patent No.: US 7,320,092 B2
(45) Date of Patent: *Jan. 15, 2008

(54) CONSUMER NETWORK DIAGNOSTIC AGENT

(75) Inventors: Dennis A. Morgan, Issaquah, WA (US); David V. Gunter, Redmond, WA (US); Benjamin E. Nick, Seattle, WA (US); Sherwood H. Lawrence, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 24 days.

This patent is subject to a terminal disclaimer.

(21) Appl. No.: 11/465,925

(22) Filed: Aug. 21, 2006

(65) Prior Publication Data

US 2006/0282704 A1    Dec. 14, 2006

Related U.S. Application Data

(63) Continuation of application No. 10/997,282, filed on Nov. 24, 2004, now Pat. No. 7,159,151, which is a continuation of application No. 09/769,199, filed on Jan. 24, 2001, now Pat. No. 6,883,118.

(51) Int. Cl.
    *G06F 11/00* (2006.01)
(52) U.S. Cl. .......................................... 714/43; 714/25
(58) Field of Classification Search ................ None
    See application file for complete search history.

(56) References Cited

U.S. PATENT DOCUMENTS

| | | | |
|---|---|---|---|
| 5,819,028 A | 10/1998 | Manghirmalani et al. | |
| 6,029,258 A | 2/2000 | Ahmad | |
| 6,170,065 B1 | 1/2001 | Kobata et al. | |
| 6,477,531 B1 | 11/2002 | Sullivan et al. | |
| 6,581,166 B1 | 6/2003 | Hirst et al. | |
| 6,651,190 B1 | 11/2003 | Worley et al. | |
| 6,697,969 B1 * | 2/2004 | Merriam | 714/46 |

OTHER PUBLICATIONS

Net Medic: Your Remedy for Poor Online Performance http://www.vitalsigns.com/netmedic/contents/datasheet_content.html; last viewed Oct. 11, 2000 5 pages.

* cited by examiner

*Primary Examiner*—Marc Duncan
(74) *Attorney, Agent, or Firm*—Amin, Turocy & Calvin, LLP

(57) ABSTRACT

A software tool and method are provided which allow an unsophisticated user to easily determine or identify problems in a networked computer system. The software tool comprises a diagnostic component adapted to determine at least one attribute associated with the computer system, and a user interface component adapted to launch the diagnostic component and to render the attribute to a user. The diagnostic component may obtain first information related to a local host computer, and selectively perform one or more tests associated with the local host computer according to the first information. The diagnostic component then determines the attribute according to the first information and/or the test results. A self-healing networked computer system is also disclosed, comprising the diagnostic component and a remedial object adapted to perform one or more remedial actions according to the attribute.

20 Claims, 12 Drawing Sheets

CONSUMER NETWORK DIAGNOSTIC AGENT

CROSS REFERENCE

This application is a continuation of U.S. patent application Ser. No. 10/997,282, filed Nov. 24, 2004, now U.S. Pat. No. 7,159,151, and entitled, "CONSUMER NETWORK DIAGNOSTIC AGENT", which is a continuation of U.S. patent application Ser. No. 09/769,199, now U.S. Pat. No. 6,883,118, filed Jan. 24, 2001, and entitled, "CONSUMER NETWORK DIAGNOSTIC AGENT." The entireties of the aforementioned applications are incorporated herein by reference.

TECHNICAL FIELD

The present invention relates generally to computer systems, and more particularly to a consumer network diagnostic agent for diagnosing problems associated with networked computer systems.

BACKGROUND

Computers are often associated with one another in a network. Problems occurring in a networked computer system can cause errors in running applications in one or more computers within the network system. Where an unsophisticated user experiences a network problem, the application being run usually indicates some failure at the application level. However, the user generally does not receive a detailed indication as to the nature of the problem causing the application failure. Diagnosing network related problems commonly requires training and experience with networked computer systems and takes a considerable amount of time.

Typically, several diagnostic tests must be performed using several different tools or complicated low-level command line interfaces. Based on the results of one such diagnostic test, a sophisticated technical person may run further tests in a hierarchical fashion, in order to expeditiously determine the cause of the problem. Due to the technical nature of computer network problems, such problems are commonly addressed by technical support personnel, who either come on-site, or work with the customer over the telephone, in order to troubleshoot the problem. Whether attempting to diagnose network problems alone, or with the help of technical support personnel, the experience is generally frustrating for consumers not trained as network experts.

Network problems can be the result of a wide range of issues, from minimal disruptions in service due to hardware troubles, to configuration problems associated with an operating system. Computer networks are generally implemented in a hierarchy of layers which segment the various required behaviors and functions in a manageable fashion. One such layered network approach is known as the ISO/OSI (International Organization for Standardization Open System Interconnection) model. Another layered network model used is the standard TCP/IP (Transmission Control Protocol/Internet Protocol) model.

Although the layered network architectures allow programmers to focus on a layer within a model without having to understand the layers above or below, the layered approach fails to provide cooperative error reporting between layers. Thus, lower layers of the network do not report meaningful errors to upper layer applications. The result is that lower layer network problems can cause upper layer application problems without giving any information about why the errors are occurring. Applications which are run by users typically do not include sophisticated methods for identifying and correcting network related errors. Because specific problems are not identified for the application by the network, no corrective action can be taken. This results in confusion and frustration for consumers, who must then call support professionals to help solve their application problems.

Support professionals are thus forced to teach the consumer how to troubleshoot or otherwise obtain diagnostic information with command line utilities such as PING, Telnet, and others. To fix network related problems, methodical troubleshooting techniques are required. The first step usually involves gathering information about the user machine. The second step is identifying what works and what doesn't. Many of the tools and techniques used in this process only frustrate a consumer who is not interested in the command line tools and interfaces that are necessary to solve the problem. In addition, the process takes a considerable amount of time, particularly where the technical support person is instructing an unsophisticated user to run such low level tests over the telephone, and having the user interpret the results. Moreover, such users are prone to mistype command line instructions, and may therefore be providing the technical support personnel with bad information. Thus, there is a need for improved network diagnostic tools and methodologies.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later. A software tool and methodology are provided, which reduce or minimize the above shortcomings associated with the prior art, whereby an unsophisticated user may easily determine or identify problems in a networked computer system. The invention provides for significant reduction in the amount of time spent troubleshooting a networked computer system, including a local host computer in the networked system.

The present invention relates to a software diagnostic tool and methodology for gathering one or more attributes or system related information and presenting the information to a user in a centralized location. The attribute information comprises system parameter settings, version information for operating systems and/or applications, status, and connectivity data, as well as an indication of adapters residing in the system and setup information related thereto. The tool obtains information and selectively performs connectivity tests and other diagnostic functions according to the obtained information, in order to provide a summary of system functionality to a user in a centralized, easy to understand format. The information is presented to the user in a collapsed display format, which the user may easily expand to obtain more detailed information. Alternatively or in combination, the information may be stored in a transferable file.

A user simply launches the diagnostics tool, which then performs the diagnostic functions and provides the results without further user intervention. Whereas prior network troubleshooting was cumbersome and required some level of computer system knowledge, the diagnostic tool is operable by unsophisticated users. In addition, the tool gathers information from a variety of sources within the system, thus providing a single point of access for the user, whereas separate tests were previously required to obtain such information. The tool thus provides advantages in technical troubleshooting over the telephone, whereby a user may simply launch the tool and report the results to technical service personnel in an orderly fashion. The tool thus facilitates speedy troubleshooting, for example, whereby as much as 30 to 45 minutes may be saved on the average technical support service call. Furthermore, because the tool automates the diagnostic testing, the possibility of erroneous information being provided to technical support personnel is minimized, whereas previous diagnostics involving command line instructions were susceptible to user typing errors.

The tool may also be employed as a component in a self-healing system. In this regard, an application error may be sensed and used to trigger the tool. The tool may then provide a result set including diagnostic information, which may then be used by another remedial software component to attempt to rectify any identified problems. The self-healing system may be operated in background or alternatively may provide the user with one or more indications, for example, that a problem has been encountered and diagnostics are being performed, or other status messages providing the user with more information related to identified problems and/or attempted fixes.

In accordance with an aspect of the present invention, there is provided a software tool, which allows an unsophisticated user to easily determine or identify problems in a networked computer system. The software tool comprises a diagnostic component adapted to determine one or more attributes associated with the computer system, and an interface component adapted to launch the diagnostic component and to render the attribute information to the user, wherein the diagnostic component and the interface component may, but need not reside on the same machine. The interface component may comprise, for example, a hierarchical tree structured graphical interface adapted to easily render the computer system attribute information in a logical fashion. In addition or alternatively to rendering the attribute information to a user, the tool may be adapted to save the attribute to a file for subsequent use.

The attribute information may comprise a first data set corresponding to services associated with the computer system, a second data set corresponding to computer information, and/or a third data set corresponding to modems and network adapters associated with the computer system. For example, the first data set may comprise information related to at least one of mail service, news service, Internet service, and loopback, the second data set may comprise information related to an operating system, and the third data set may comprise information related to at least one of a modem, a network adapter and an installed client.

The diagnostic component may be adapted to query a data store and/or to perform one or more diagnostic tests such as verifying a connection. Based on the information thus obtained, the diagnostic component may selectively perform one or more of such diagnostic tests. For example, the diagnostic component may query a registry associated with the computer system. In addition, the diagnostic component may comprise a ping utility adapted to test a network by sending out a packet and waiting for a response. The ping utility may further determine whether a particular IP address is online, and/or to determine an IP address from the response.

According to another aspect of the invention, there is provided a method of diagnosing problems in a networked computer system, comprising determining one or more attributes associated with the networked computer system, and rendering the attributes to a user. The determination of the attribute information may comprise obtaining a first data set comprising information related to at least one of mail service, news service, Internet service, and loopback. Alternatively or in combination, the method may comprise obtaining a second data set comprising information related to an operating system, and obtaining a third data set comprising information related to at least one of a modem, a network adapter, and an installed client. This may be achieved, for example, by querying a data store, such as a computer system registry, and/or by verifying a connection. Verifying a connection may comprise sending out a packet and waiting for a response, determining an IP address from the response, and/or determining whether a particular IP address is online.

In accordance with yet another aspect of the invention, there is provided a computer-readable medium having computer-executable instructions for performing the methods of the invention, including instructions for determining at least one attribute associated with the computer system, and rendering the at least one attribute to a user.

According to still another aspect of the invention, there is provided a self-healing networked computer system, comprising a diagnostic component adapted to determine one or more attributes associated with the networked computer system, and a remedial object adapted to perform at least one remedial action according to the attribute information. The remedial action may comprise determining another attribute associated with the computer system according to the attribute information using the diagnostic component. The diagnostic component may be further adapted to determine another attribute associated with the computer system after performance of the at least one remedial action. In addition, the system may comprise a user interface component adapted to render the at least one attribute to a user, to render information related to the at least one remedial action to the user, and/or to launch the diagnostic component.

In accordance with another aspect of the invention, there is provided a user interface associated with a networked computer system, comprising a first component adapted to launch a diagnostic tool, and a second component adapted to render attribute information related to the computer system to a user. The user interface may be graphical, audio, or any other form of interface. The second component may be adapted to render the attribute information to the user in a hierarchical fashion, for example, in a hierarchical tree structure having collapsible and expandable portions. The attribute information may comprise a first data set corresponding to services associated with the networked computer system, a second data set corresponding to computer information, and/or a third data set corresponding to modems and network adapters associated with the computer system.

According to yet another aspect of the invention, there is provided a data packet for transmission between at least two processes, which comprises a diagnostic component adapted to determine one or more attributes associated with a networked computer system, and a user interface component adapted to launch the diagnostic component and to render the attributes to a user. Still another aspect of the invention provides a software tool for diagnosing problems in a networked computer system, comprising a diagnostic component adapted to determine at least one attribute associated with the computer system, and a client side computer having a user interface component adapted to launch the diagnostic component and to render the at least one attribute to a user.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
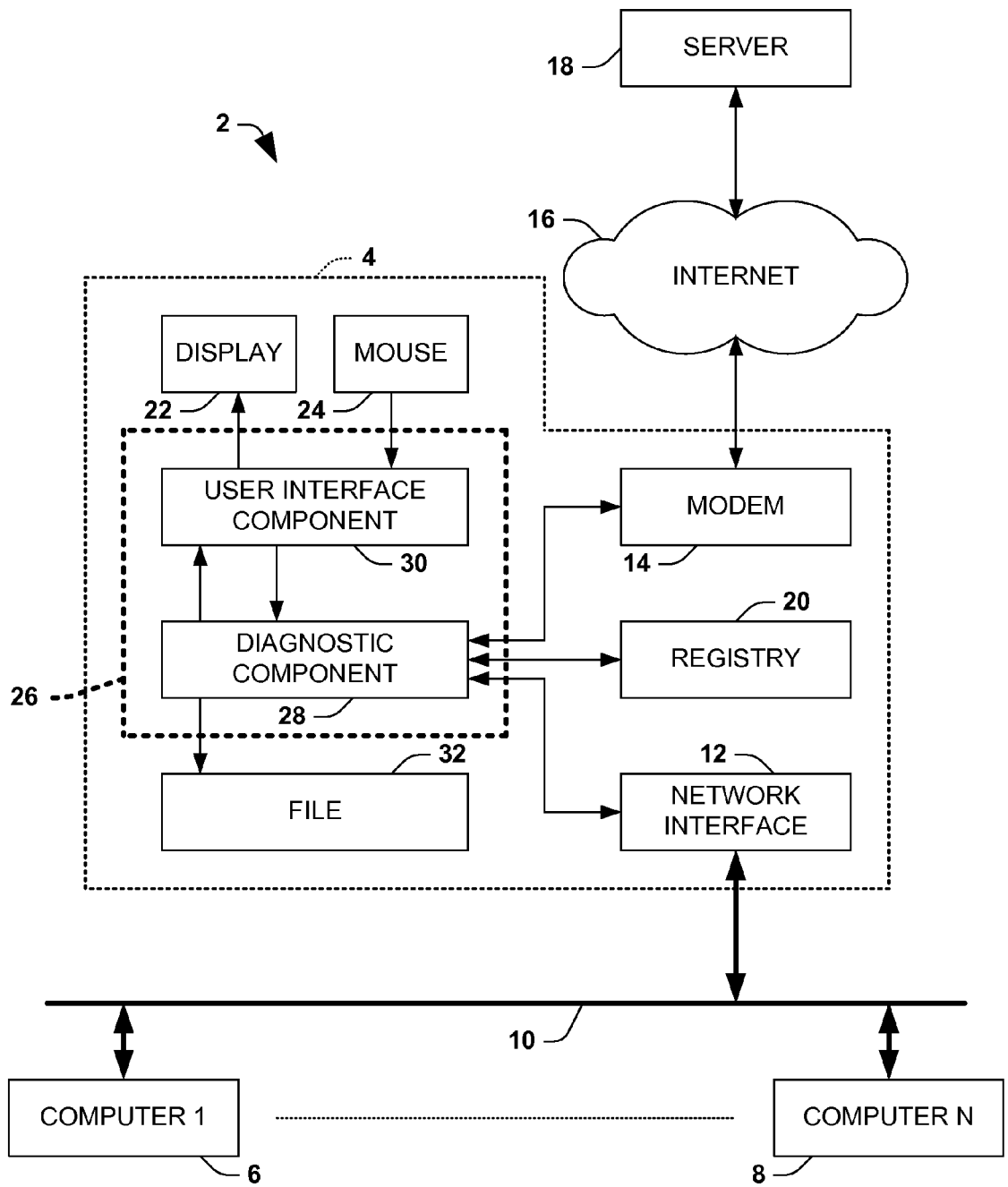
FIG. 1 is a schematic diagram illustrating an exemplary diagnostic tool in accordance with another aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention.

Referring now to the drawings, the present invention comprises an easy to use software tool and methodology by which an unsophisticated user may easily determine or identify problems in a networked computer system. The software tool may be used in association with, or comprise, a graphical or other type of user interface whereby the user may be provided with useful attribute information related to the computer system in a central location in order to improve and/or streamline troubleshooting network and other computer system problems. Alternatively or in combination, the diagnostic tool may be employed in association with a remedial software component or object, by which a self-healing computer system may be implemented.

Referring now to FIG. 1, an exemplary networked computer system 2 is illustrated having a local host computer 4 connected to one or more associated computers 6 and 8 via a network 10, which may be a local area network (LAN), a wide area network (WAN), or other type of network. The local host computer 4 accesses the network 10 using a network interface 12, whereby communication between the local host computer 4 and the various associated computers 6 and 8 is provided according to known network protocols. The computer system may further comprise a modem 14 providing access to the Internet 16 or other network (not shown) by which the local host computer 4 may access a server 18. In addition, the local host computer 4 comprises a registry 20 or other type of data store having information relating to the local host computer 4. Interfacing with the local host computer 4 may be accomplished by a user via a display 22 and a mouse 24 and/or a keyboard (not shown), wherein the display 22 may be a touch screen type. It will be appreciated that interfacing may alternatively or in combination be accomplished via audio interfacing components (not shown), such as microphones, speakers, audio annunciators, and the like.

In accordance with an aspect of the invention, the networked computer system 2 may comprise a diagnostic software tool 26 having a diagnostic component 28 adapted to determine at least one attribute associated with the networked computer system 2, and a user interface component 30 adapted to launch the diagnostic component 28 (e.g., using the mouse 24 and the display 22) and to render the attribute to a user, for example using the display 22. The diagnostic software tool 26 advantageously gathers or obtains information related to the computer system 2 and other attributes associated therewith, and selectively performs one or more tests associated with the local host computer 4. One or more attributes are then obtained by the diagnostic component based on the obtained information and/or the test results. The user interface component 30 may then render these attributes to a user in a unified structured form. Alternatively or in combination to rendering by the interface component 30, the attribute information may be stored in a file 32. Thus, the user need not perform complicated or tedious tests from a command line, as was required in the past, in order to quickly determine and/or identify problems in the networked computer system 2 or the local host computer 4. In addition, the tool 26 may easily gather one or more such attributes from a variety of sources, for example, by querying one or more data stores (e.g., registry 20) and/or by performing one or more diagnostic tests, as illustrated and described in greater detail hereinafter.

These attributes may comprise data relating to services associated with the local host computer 4, such as electronic mail (e-mail) service, news service, Internet service, and loopback. Other data may be gathered by the diagnostic component 28, such as information relating to an operating system (not shown). For example, the version number and configuration of an operating system residing on the local host computer 4 may be obtained and rendered to the user on the display 22. Moreover, information related to the modem 14, the network adapter or interface 12, and any installed clients may be thus gathered by the diagnostic component 28. In order to determine the attributes of the computer 4, the diagnostic component 28 may query a data store, such as the registry 20, and/or one or more files (not shown) in the local host computer 4.

In addition, the diagnostic component 28 may perform one or more diagnostic tests, including verifying one or more connections between the computer 4 and other computers (e.g., computers 6 and 8, and/or server 18). Such tests may be performed selectively according to information obtained by the diagnostic component 28. The diagnostic component 28 may accordingly comprise a ping utility (not shown) adapted to test the network 10 and/or the connectivity between the local host computer 4 and the Internet 16, by sending out a packet (not shown) and waiting for a response. Moreover, the component 28 may determine whether a particular IP address is online, and determine an IP address from the response.

In addition to rendering the attribute information to a user via the user interface component 30, the attribute or attributes associated with the computer 4 may alternatively or in combination be stored into the file 32 in the local host computer 4. This allows a user or technical support personnel to determine the relative health of the computer 4, or to provide a historical snapshot of the system performance and configuration. In one application, the file 32 may be e-mailed to a support person from the local host computer 4, or if the computer 4 cannot presently send e-mails, the file 32 may be saved to a floppy and e-mailed from another computer nearby (e.g., computer 6 or 8). Furthermore, where a network problem is of a recurring nature, the archival of such attribute files 32 provides technical support personnel with a history of the configuration of the computer 4 at one or more points in time, which may provide insight as to the cause of a current problem.

The diagnostic software tool 26 may be launched by a user by a single button click using the user interface component 30, after which the diagnostic component 28 obtains information and selectively performs one or more network troubleshooting tests automatically based on the obtained information. This acquired information and/or test results may comprise, for example, determining computer system properties, determining version levels of operating systems and/or management utilities such as Windows management instrumentation (WMI). Diagnostic component 28 may further determine and enumerate network adapter configurations, modem configurations, PPP (Point-to-Point Protocol) and VPN (virtual private network) adapter configurations.

Connectivity tests may also be performed by the diagnostic component 28, such as by employing a packet Internet groper (PING) utility to 'ping' various connections. For example, a PING utility may send out a packet and wait for a response, in order to determine an Internet protocol (IP) address from the response and/or to determine whether a particular IP address is online. Such a PING utility may be employed by the diagnostic component 28 to ping a loopback IP address, ping each adapter's IP address, ping each configured default gateway, ping each configured domain name system (DNS) server, ping each configured Windows Internet name service (WINS) server, ping an Internet explorer-configured proxy server, ping a default Outlook Express mail server, and/or to ping a default Outlook Express news server.

The connectivity tests may be performed using various connection protocols. For example, the diagnostic component 28 may attempt to connect via transmission control protocol (TCP) to the default Outlook Express mail server, to the default Outlook Express news server, and/or to the configured proxy server port. It will be appreciated that many different types of testing and test variations are possible and contemplated as within the scope of the present invention, which is not limited to those illustrated and specifically described herein. Thus, the diagnostic component may, for example, ping and connect via TCP by IP or by hostname, integrate with WMI, and provide PING and connect via TCP methods for customizing HTML scripts. Moreover, it will be appreciated that the diagnostic component 28 of the software tool 26 may obtain information from the registry 20 and/or other data store (not shown) through a variety of methods. For instance, information from the registry 20 may be obtained by component 28 using one or more providers.

Figure 2:
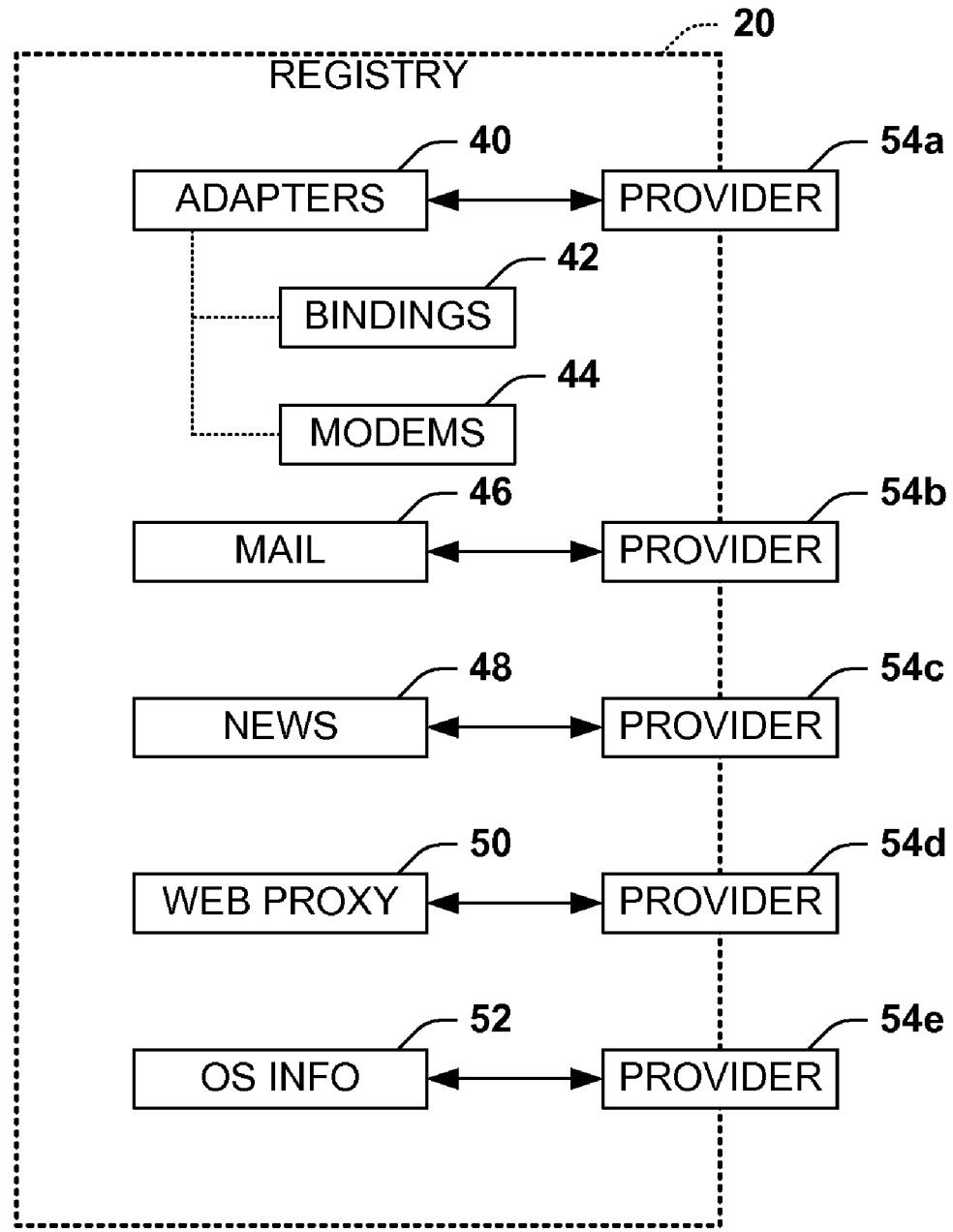
FIG. 2 is a schematic diagram illustrating an exemplary set of attribute information related to a computer system.
Figure 3:
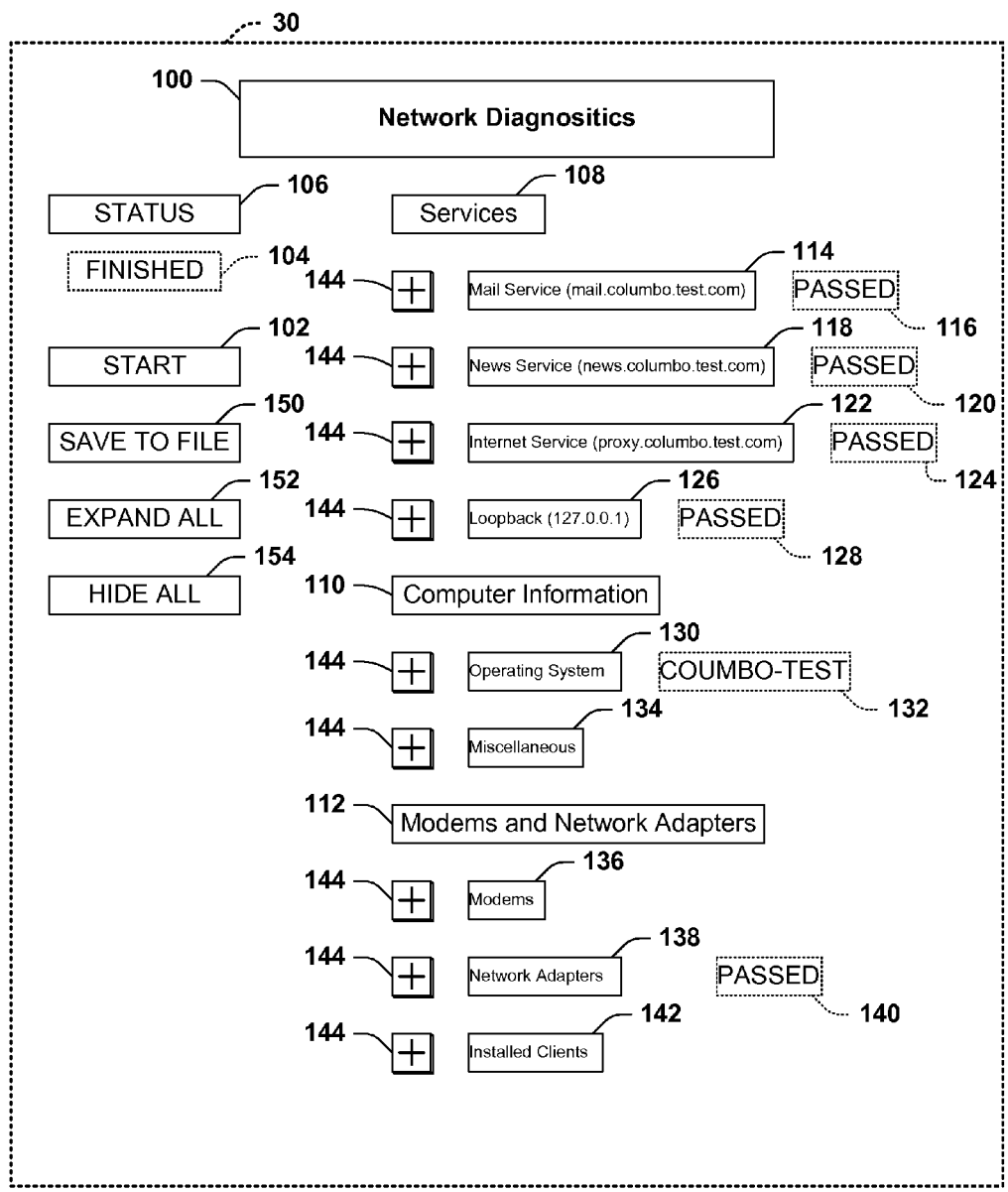
FIG. 3 is a schematic diagram illustrating an exemplary diagnostic user interface in accordance with an aspect of the invention.

Referring also to FIGS. 2 and 3, the registry or data store 20 may comprise data or information related to adapters 40, including binding information 42 and modem related information 44. The registry may further comprise information relating to mail services 46, news services 48, web proxy services 50, and/or to one or more operating systems 52. Such data store information may be obtained from the registry 20 by the diagnostic component 28 via one or more provider objects 54a, 54b, 54c, 54d, and 54e. The attribute information and data obtained by the diagnostic component 28 via queries to a data store (e.g., registry 20) and/or through performance of one or more diagnostic tests, may be advantageously provided to the user of the local host computer system 4 via the user interface component 30, as illustrated in FIG. 3. While the exemplary user interface 30 is illustrated as a graphical user interface, it will be appreciated that other forms of user interface fall within the scope of the invention, including but not limited to audio and combination graphical/audio interfaces.

The exemplary user interface component 30 may be implemented as an HTML page and comprises a title indicia 100 indicating that the user is interfacing with the network diagnostics tool 26. The interface component 30 allows the user to launch the diagnostic component 28 using a start activator component 102. The status of the diagnostic component 28 is provided to the user via a status indicia 104 (e.g., having values such as running, finished, and the like) located proximate a status label component 106. The exemplary interface component 30 provides a user with a variety of attribute information in a hierarchical fashion via a logical grouping of such information. In this regard, the interface 30 comprises main groupings or categories for service information, computer information, and information relating to modems and adapters, having group title label components 108, 110, and 112, respectively. Moreover, it will be appreciated that the hierarchical organization and presentation of attribute information may be similarly or equivalently provided in non-graphical interfaces (e.g., audio, etc.) within the scope of the present invention.

The hierarchy of the interface 30 further comprises subcategories or subgroupings under the main groupings. The services grouping under the services group title label component 108 comprises a mail service subgroup having an associated label component 114 and a pass/fail indicia 116, a news service subgroup having an associated label component 118 and a pass/fail indicia 120, an Internet service subgroup having an associated label component 122 and a pass/fail indicia 124, and a loopback service subgroup having an associated label component 126 and a pass/fail indicia 128. The label components 114, 118, 122, and 126 may include indications of the service subcategory (e.g., Mail Service, News Service, Internet Service, and Loopback, respectively) as well as address information relating to the specifics of the test performed (e.g., mail.columbo.test.com) as illustrated in FIG. 3. The pass/fail indicia 116, 120, 124, and/or 128, may advantageously indicate to a user whether a particular test has passed or failed. In addition, these indicia may further indicate that a particular test is unreachable, thus providing further useful troubleshooting information.

The computer information grouping under the title label component 110 comprises an operating system subgroup having an associated label component 130 and a test indicia 132, as well as a miscellaneous subgroup with a label component 134. The modems and adapters group under the title label component 112 comprises a modems subgroup having an associated label component 136, a network adapters subgroup having an associated label component 138 and a pass/fail indicia 140, and an installed clients subgroup having an associated label component 142. Each hierarchical subgroup in the interface component 30 may further comprise a collapse/expand actuator component 144. The collapse/expand indicia 144 allow a user to selectively expand and/or collapse the subgroup attribute information rendering in hierarchical fashion, in order to obtain further details regarding specific information gathered from one or more data stores (e.g., registry 20) associated with the computer 4, and/or the results of one or more diagnostic tests performed by the diagnostic component 28, as illustrated and described in greater detail hereinafter.

The user interface component 30 further comprises a save to file activator component 150, an expand all activator component 152, and a hide all activator component 154. The save to file activator component 150 may be actuated by the user in order to cause the attribute information (e.g., information from a data store as well as diagnostic test results obtained by the diagnostic component 28) to be saved to a file (e.g., file 32) associated with the computer 4 for transmission to a technical service provider and/or archival, as described above. The expand all and hide all activator components 152 and 154 may be actuated by the user in order to selectively expand and collapse each subgroup or branch in the hierarchical grouping of attribute information provided in the interface component 30, whereas the individual collapse/expand indicia 144 allow a user to selectively expand and/or collapse one such subgroup at a time.

Although not specifically illustrated and described herein, it will be appreciated that many other groupings of attribute information and rendering forms thereof are possible. The diagnostic component 28, together with the exemplary user interface component 30 of FIG. 3 provides the user with an organized, easy to use network diagnostic tool 26. A user may be instructed by a technical support person to simply launch the diagnostic component 28 by actuating the start activator component 102 of interface 30, using an actuator device, for example, the mouse 24, a touch screen display (e.g., display 22), or via voice commands. The diagnostic component 28 thereafter gathers information and/or performs one or more diagnostic tests, and renders the attribute information to the user in the interface 30.

The user may report the results to a technical support person, and selectively (or collectively) expand the rendered attributes using the individual collapse/expand indicia 144 (and/or the expand all activator component 152) as needed to display or otherwise obtain more detailed attribute information. The diagnostic software tool 26 thus provides significant advantages over the prior diagnostic tools and techniques where the user was forced to type in complicated command lines to actuate low level diagnostic utilities one at a time, and attempt to report the results accurately to a technical support person.

Figure 4:
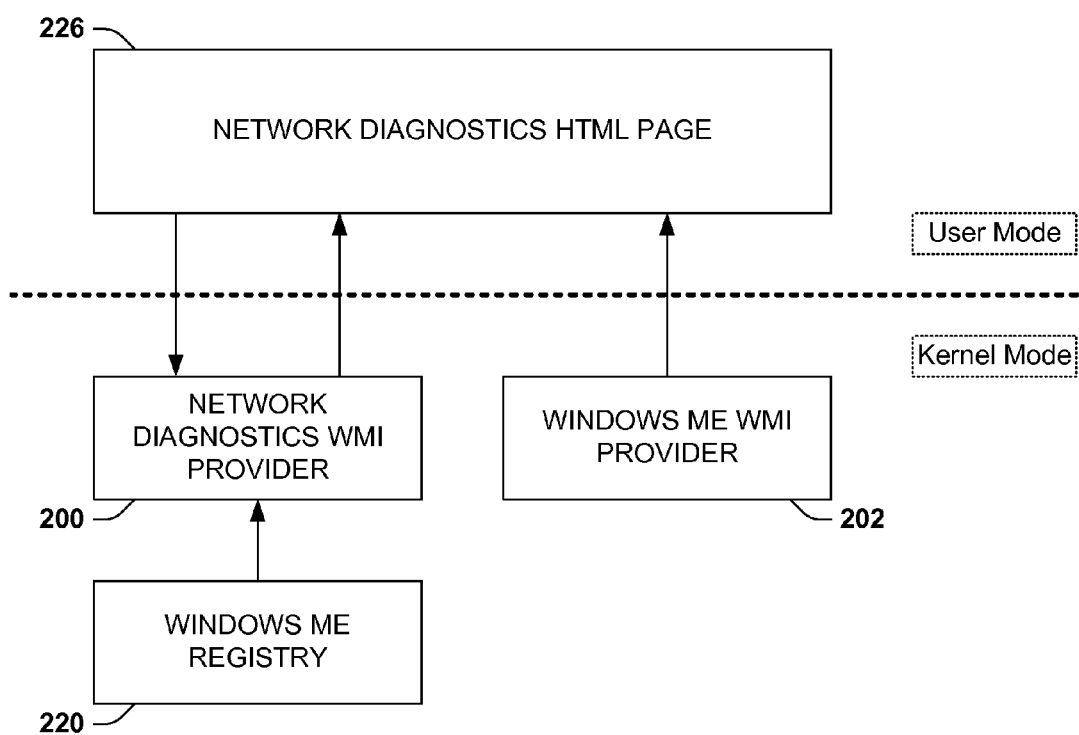
FIG. 4 is a schematic diagram illustrating an exemplary network diagnostic HTML page interfacing a computer system registry in accordance with another aspect of the invention.

Referring now to FIG. 4, the diagnostic tool 226 may comprise a user interface component (e.g., component 30 of FIGS. 1 and 3) and a diagnostic component (e.g., component 28) which obtains information from a data store (e.g., registry 20) via one or more providers. In one example, the tool 226, operating in user mode, may obtain attribute information from a registry 220 via a network diagnostics windows management instrumentation (WMI) provider 200, which operates in the computer system (e.g., local host computer 4) in kernel mode. In addition, one or more of the diagnostic tests initiated by the diagnostic component of the tool 226, may be performed using a windows WMI provider 202. Although illustrated using WMI providers, the invention finds application in association with other providers. In addition, although the exemplary tools and systems are illustrated as employing Windows or Windows millennium edition (ME) operating systems, it will be appreciated that the invention comprises tools and methods for diagnosing network related problems in systems employing other operating systems, such as UNIX®, LINUX®, etc.

The network diagnostics tool 226 may thus obtain attribute information using the WMI provider utility. The network diagnostics WMI provider 200 may be adapted to query the operating system and the system registry (e.g., registry 220) for parameters of interest to technical support personnel in troubleshooting network and other system problems. The WMI provider 202 is responsible for performing one or more diagnostic tests and reporting results to the user interface component of the diagnostic tool 226, which user interface may comprise an HTML page.

The network diagnostics HTML page gathers network resource information from the providers 200 and 202, and sends appropriate instructions to the provider 200 for testing the availability of these resources. If the information reported is in question, corroboration through wbemtest (a WMI testing tool, not shown) may be employed. The network diagnostics WMI provider 200 may expose an interface for both local and remote network tests. In addition, the provider 200 may support the ability to query for information and may provide one or more methods of testing network resources, for example, via PING and TCP connections.

The information available via the providers 200 and 202 may comprise current proxy settings for browser applications such as Internet Explorer®, the current default mail server for mail service applications such as Outlook Express®, the current default news server for news service applications such as Outlook Express®, and the ports each of the above are configured to use. These properties may be obtained by referencing within programs or scripts in the diagnostic component 28, for example, scripts created using JavaScript, VBScript, C, C++, and many other programming languages supported by the WMI framework. Other providers may be employed in the implementation of one or more aspects of the invention apart from the providers specifically illustrated and described herein.

Examples of the properties that may be accessed via the network diagnostics WMI provider 200 include Netdiag.IEProxy (e.g., what is the currently configured proxy server?), Netdiag.IEProxyPort (e.g., what proxy port is IE using?), Netdiag.MailServer (e.g., what is the currently configured mail server?), Netdiag.MailPort (e.g., what email port is Outlook Express using?), Netdiag.NewsServer (e.g., what is the currently configured news server?), and Netdiag.NewsNNTPPort (e.g., What news port is Outlook Express using?). In addition, various diagnostic tests may be performed in the tool 226 using one or more methods provided by the network diagnostics WMI provider 200. Examples of these methods include Netdiag.Ping (addr, str) (e.g., PING address), and Netdiag.ConnectToPort (addr, port) (e.g., connect to address and port).

The diagnostic tool 226 may thus employ script (e.g., VBScript, JavaScript, and the like) in order to access these useful pieces of information and/or to initiate simple network and connectivity tests via a diagnostic component (e.g., component 28). The following are three sample pieces of code which demonstrate how various properties may be accessed via the network diagnostics WMI provider 200, the PING method and the ConnectToPort method. This sample code was written using HTML and VBScript, although other types and forms of such script fall within the scope of the present invention.

```
Get Properties Script:
<HTML>
<HEAD>
<TITLE>Network Diagnostics Properties Example</TITLE>
</HEAD>
<BODY id=main rightMargin=50>
<script id=shared_vbs language="VBScript">
<!--
On error resume next
' Globals
Dim netdiag
function onLoad( )
  set all = document.all
  main.style.cursor = "wait"
  set t_Default = Locator.ConnectServer(, "root/default")
  set netdiags = t_Default.ExecQuery("Select * from
  NetDiagnostics")
  for each g in netdiags
    set netdiag = g
  next
  strProps = getProps( )
  netprops.innerHTML = strProps
  main.style.cursor = "auto"
end function
' getProps
public function getProps( )
  strIEP = CStr(netdiag.IEProxy)
  strIEPP = CStr(netdiag.IEProxyPort)
  str = str + "<b>Proxy: </b>" + strIEP + "<b>
  Port: </b>" + strIEPP + "<br>"
  strMS = CStr(netdiag.MailServer)
  strMSP = CStr(netdiag.MailPort)
  str = str + "<b>Mail: </b>" + strMS + "<b>
  Port: </b>" + strMSP + "<br>"
  strNS = CStr(netdiag.NewsServer)
  strNSP = CStr(netdiag.NewsNNTPPort)
  str = str + "<b>News: </b>" + strNS + "<b>
  Port: </b>" + strNSP + "<br>"
  getProps = str
end function
// -->
</script>
<h1 id=L_Title_Text>Network Diagnostics Properties
Example</h1>
<table>
<tr><td bgcolor=c0c0c0><strong>List of
properties</strong></td></tr>
<tr><td><input type="button" name="pingbutton"
value="Get Properties"
onclick="onLoad( )">
</td></tr>
<tr><td><span id=netprops></span></td></tr>
```

-continued

```
</table>
</BODY>
<OBJECT ID="Locator"
CLASSID="CLSID:76A64158-CB41-11D1-8B02-
00600806D9B6"></OBJECT>
</HTML>
Ping Destination Script:
<HTML>
<HEAD>
<TITLE>Network Diagnostics Ping Example</TITLE>
</HEAD>
<BODY id=main rightMargin=50>
<script id=shared_vbs language="VBScript">
<!--
On error resume next
' Globals
Dim netdiag
function onLoad( )
  set all = document.all
  main.style.cursor = "wait"
  set t_Default = Locator.ConnectServer(, "root/default")
  set netdiags = t_Default.ExecQuery("Select * from
  NetDiagnostics")
  for each g in netdiags
    set netdiag = g
  next
  strPing = getPing(pingaddr.value)
  pingtestdiv.innerHTML = strPing
  main.style.cursor = "auto"
end function
' getPing
public function getPing (addr)
  getPing = ""
  if Not IsEmpty(addr) then
    if netdiag.Ping (addr, str) then
      strPing = "Successful ping - " + str
    else
      strPing = "Cound not ping - " + str
    end if
  end if
  getPing = strPing
end function
// -->
</script>
<h1 id=L_Title_Text>Network Diagnostics Ping Example</h1>
<table>
<tr><td bgcolor=c0c0c0><strong>Ping Test</strong></td></tr>
<tr><td><input type="text" name="pingaddr" value="">
<input type="button" name="pingbutton"
value="Ping" onclick="onLoad( )">
</td></tr>
<tr><td><span id=pingtestdiv></span></td></tr>
</table>
</BODY>
<OBJECT ID="Locator"
CLASSID="CLSID:76A64158-CB41-11D1-8B02-
00600806D9B6"></OBJECT>
</HTML>
TCP Connection Script:
<HTML>
<HEAD>
<TITLE>Network Diagnostics TCP Connect Example</TITLE>
</HEAD>
<BODY id=main rightMargin=50>
<script id=shared_vbs language="VBScript">
<!--
On error resume next
' Globals
Dim netdiag
function onLoad( )
  set all = document.all
  main.style.cursor = "wait"
  set t_Default = Locator.ConnectServer(, "root/default")
  set netdiags = t_Default.ExecQuery("Select * from
  NetDiagnostics")
  for each g in netdiags
    set netdiag = g
  next
  strPort = getPort(tcp_addr.value,tcp_port.value)
```

-continued

```
    tcptestdiv.innerHTML = strPort
    main.style.cursor = "auto"
    end function
' getPort
public function getPort (tcpaddr, tcpport)
    getPort = ""
    if tcpaddr <> "" and tcpport <> "" then
        if netdiag.ConnectToPort (tcpaddr, tcpport) then
            strPort = "Successfully connected to "
            strPort = strPort + tcpaddr + " on port: " + tcpport
        else
            strPort = "Could not connect to "
            strPort = strPort + tcpaddr + " on port: " + tcpport
        end if
    else
        strPort = "Please enter Destination and Port"
    end if
    getPort = strPort
end function
// -->
</script>
<h1 id=L__Title__Text>Network Diagnostics TCP Connect
Example</h1>
<table>
<tr><td bgcolor=c0c0c0><strong>TCP Connection
Test</strong></td></tr>
<tr><td>Destination: <input type="text"
name="tcp_addr" value="">
Port: <input type="text" name="tcp_port" value="">
<input type="button" name="tcpportbutton"
value="Connect" onclick="onLoad( )">
</td></tr>
<tr><td><span id=tcptestdiv></span></td></tr>
</table>
</BODY>
<OBJECT ID="Locator"
CLASSID="CLSID:76A64158-CB41-11D1-8B02-
00600806D9B6"></OBJECT>
</HTML>
```

Figure 5:
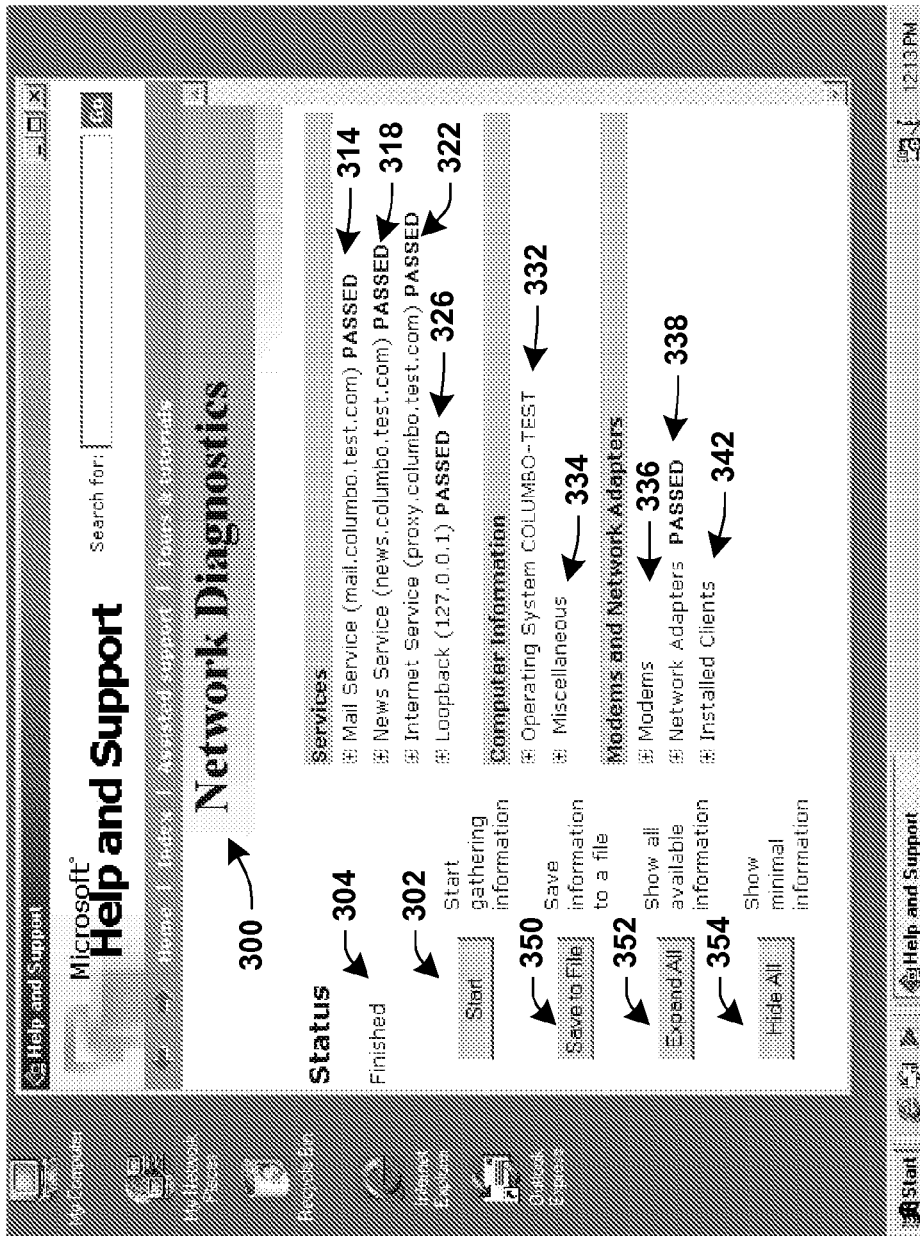
FIG. 5 is an illustration of an exemplary graphical user interface in accordance with another aspect of the invention.

Referring now to FIGS. 5-9, an exemplary user interface component 330 is illustrated. As illustrated in FIG. 5, the interface component 330 comprises a title indicia 300, and allows a user to launch the diagnostic component 28 using a start activator component 302. The status of the diagnostic component 28 is provided to the user via a status indicia 304. The interface component 330 provides a user with a variety of attribute information in a hierarchical fashion via a logical grouping of such information. Accordingly, the interface 330 comprises main groupings or categories for service information, computer information, and information relating to modems and adapters, although other such groupings are contemplated as falling within the scope of the present invention.

The hierarchy of the interface 330 further comprises subgroups under the main groupings to render information and/or test results related to services, computer information, and modems and networks, respectively. For example, the service information grouping in the interface component 330 comprises a mail service subgroup having an associated label component and a pass/fail indicia (collectively 314), a news service subgroup having an associated label component and a pass/fail indicia (collectively 318), an Internet service subgroup having an associated label component and a pass/fail indicia (collectively 322), and a loopback service subgroup having an associated label component and a pass/fail indicia (collectively 326).

The computer information group comprises an operating system subgroup having an associated label component and a test indicia (collectively 332), as well as a miscellaneous subgroup with a label component 334. The modems and adapters group comprises a modems subgroup having an associated label component 336, a network adapters subgroup having an associated label component and a pass/fail indicia (collectively 338), and an installed clients subgroup having an associated label component 342. Each hierarchical subgroup in the interface component 330 may further comprise a collapse/expand actuator component (not numerically designated), allowing a user to selectively expand and/or collapse the subgroup attribute information rendering in hierarchical fashion, in order to obtain further detailed information.

The user interface component 330 further comprises a save to file activator component 350, an expand all activator component 352, and a hide all activator component 354. As described above with respect to FIG. 3, the save to file activator component 350 may be actuated by the user in order to cause the attribute information to be saved in a file for transmission to a technical service provider and/or archival. The expand all and hide all activator components 352 and 354 may be actuated by the user in order to selectively expand and collapse each subgroup or branch in the hierarchical grouping of attribute information provided in the interface component 330, and the individual collapse/expand indicia may be employed to selectively expand and/or collapse one such subgroup at a time, as illustrated in FIGS. 6-9.

Figure 6:
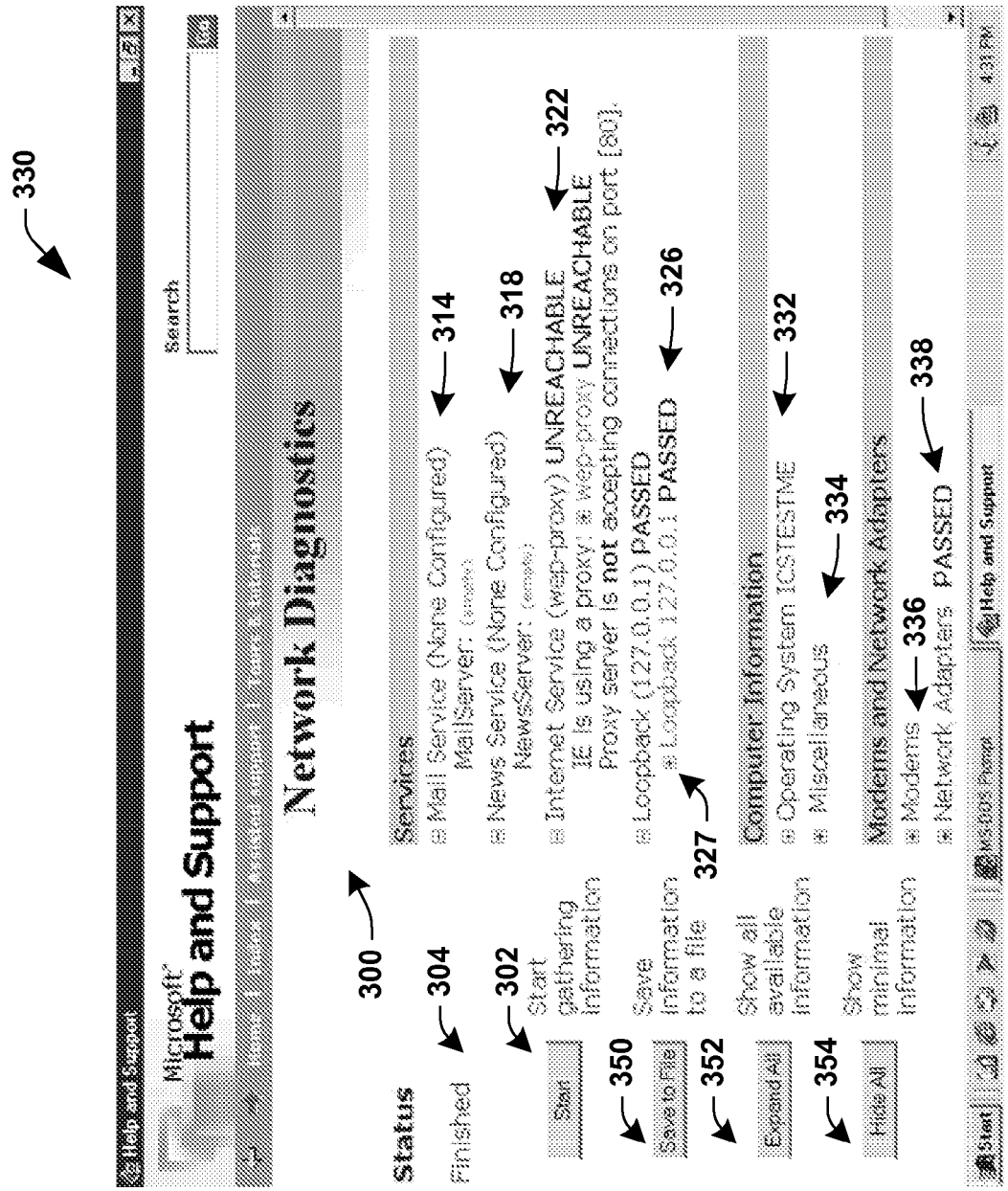
FIG. 6 is an illustration of further aspects of the graphical user interface of FIG. 5.

For example, when the user expands the hierarchical information groups associated with the service information grouping, as illustrated in FIG. 6, more detailed information relating to the mail service, news service, Internet service, and loopback service subgroups may be provided in the interface 330. In the example of FIG. 6, the user has no mail or news services defined and is currently unable to contact the web proxy setting for the Internet Explorer web browser. It will be noted that prior to the present invention, the user would need to open the Internet Explorer control panel and Outlook Express settings in order to obtain the information provided in the present invention in a centralized location via the exemplary interface 330. Thus, the invention may be advantageously employed in troubleshooting the user system, even by inexperienced or unsophisticated users. It will also be noted that the hierarchical rendering of system-related information includes further information relating to the loopback service subgroup 326 which may be further expanded by the user via another collapse/expand indicia 327 located beneath the loopback service subgroup label component 326 as illustrated in FIG. 6.

Figure 7:
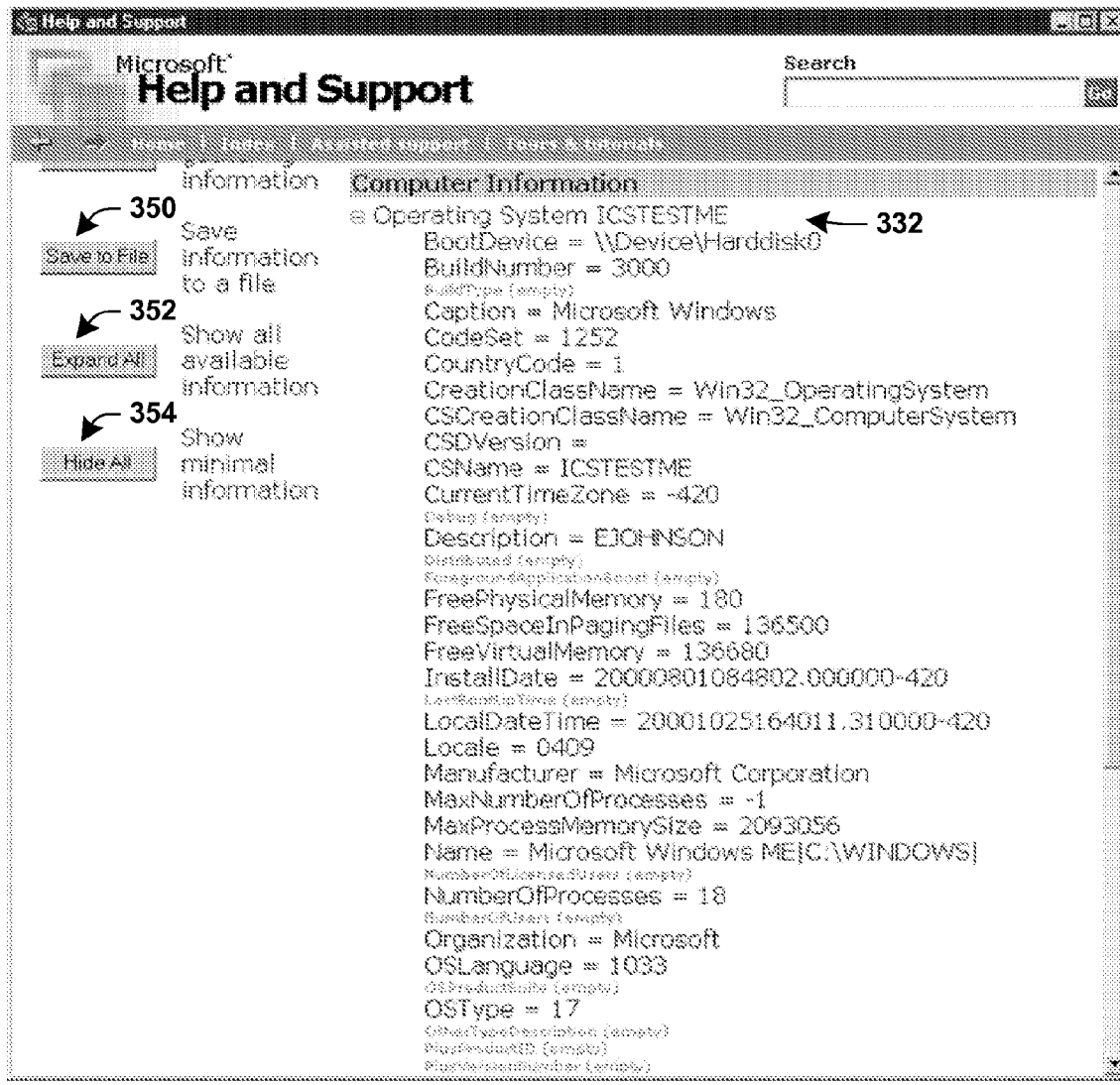
FIG. 7 is another illustration of further aspects of the graphical user interface of FIGS. 5 and 6.

Another example of the expanded information presentation capabilities of the invention is illustrated in FIG. 7. Here, the interface 330 is shown with the operating system subgroup of the computer information grouping expanded. The expanded information rendering includes data and other information relating to the core operating system. In the past, the user would need to search through the system registry or other data store, in order to obtain such information.

Figure 8:
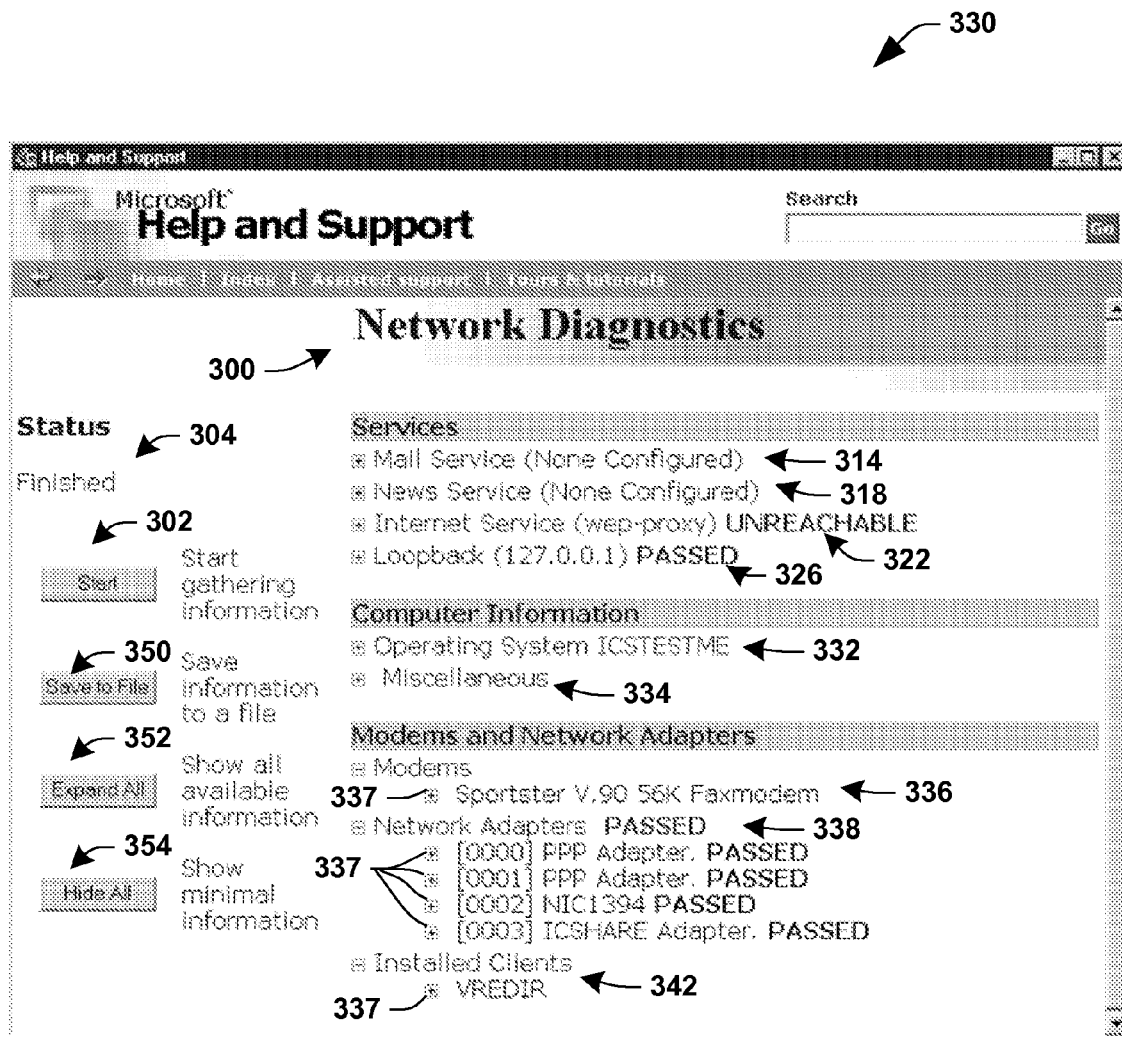
FIG. 8 is another illustration of further aspects of the graphical user interface of FIGS. 5-7.

Referring also to FIG. 8, the exemplary interface component 330 is illustrated with the modems and networks information grouping expanded to provide further information relating to the modems, network adapters and installed clients in the system. In the example illustrated in FIG. 8, the user has a single modem installed, two point-to-point protocol (PPP) type connections, a 1394 network interface card (NIC) adapter and an Internet connection sharing (ICS) adapter installed. Further information relating to the specific modems and adapters (e.g., configuration information and the like) may be easily displayed in the interface component 330 using the collapse/expand indicia 337. In the past, the user would have to access a network neighborhood properties utility to determine the installation of the 1394 NIC and ICS adapters, and would go to a modem control panel utility in order to determine which modem is installed. In addition, the user would need to access a dial-up connections folder to find out what PPP type connections were resident on the system.

Figure 9:
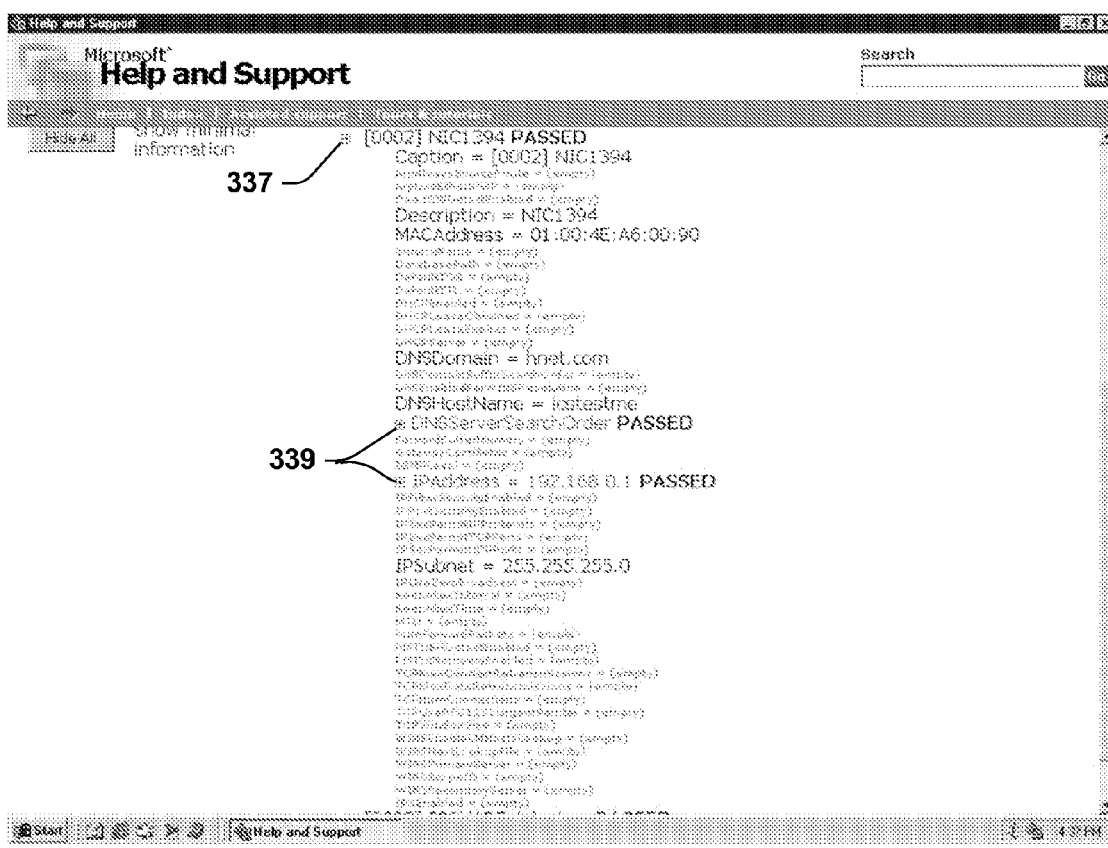
FIG. 9 is another illustration of further aspects of the graphical user interface of FIGS. 5-8.

Referring also to FIG. 9, if the user desires more information relating to the 1394 NIC adapter, the collapse/expand indicia 337 associated therewith may be employed to further expand the rendered information. As illustrated, the user may thereby obtain further information about the 1394 adapter, as well as the results of one or more tests associated therewith. These test results may be further expanded using further hierarchical collapse/expand indicia 339. Previously, the user would have to open the network properties utility, and further access the binding for the 1394 NIC adapter within the network properties utility (e.g., TCP->1394) and view the properties associated therewith to obtain basic information, such as IP settings associated with the adapter. In addition, the user would have to search through the system registry, and open a command prompt to run various tests manually, in order to obtain the results available through the exemplary interface component 330.

As soon as the diagnostic component of the tool is launched (e.g., via start activator component 302, it will begin gathering and testing various network components. The tool will find computer information, enumerate network adapters, attempt to connect via TCP to configured services, and attempt to ping configured network services. Both successful and unsuccessful attempts to reach network resources may then be rendered to the user via the interface component 330. Among other things, the tool may render the machine name, the version of one or more utilities or applications (e.g., WMI) and the version of the operating system. It also tests the availability of services that have been configured. The following are exemplary lists of information which may be rendered and/or information which may be tested using the diagnostic tool. It will be appreciated that the following lists are provided as examples, and that tests, information, and groupings other than those specifically illustrated and described herein are contemplated as falling within the scope of the invention.

The items and information that are reported may comprise services such as Outlook Express default mail server, Outlook Express default news server, and Internet Explorer proxy server.

Computer related information which is rendered to the user via the interface component 330 comprises operating system information such as BootDevice=\\Device\Harddisk0, BuildNumber=2514, BuildType (empty), Caption=Microsoft Windows, CodeSet=1252, CountryCode=1, CreationClassName=Win32_OperatingSystem, CSCreationClassName=Win32_ComputerSystem, CSDVersion=, CSName=COLUMBO-TEST, CurrentTimeZone=-480, Debug (empty), Description=Test Machine, Distributed (empty), ForegroundApplicationBoost (empty), FreePhysicalMemory=54148, FreeSpaceInPagingFiles=1929044, FreeVirtualMemory=1983192, InstallDate=20000307055202.000000-480, LastBootUpTime (empty), LocalDateTime=20000309121053.060000-480, Locale=0409, Manufacturer=Microsoft Corporation, MaxNumberOfProcesses=-1, MaxProcessMemorySize=2093056, Name=Microsoft Windows ME|C:\WINDOWS|, NumberOfLicensedUsers (empty), NumberOfProcesses=14, NumberOfUsers (empty), Organization=msft, OSLanguage=1033, OSProductSuite (empty), OSType=17, OtherTypeDescription (empty), PlusProductID (empty), PlusVersionNumber (empty), Primary=True, QuantumLength (empty), QuantumType (empty), RegisteredUser=test, SerialNumber (empty), ServicePackMajorVersion (empty), ServicePackMinorVersion (empty), SizeStoredInPagingFiles=1966632, Status=OK, SystemDevice (empty), SystemDirectory=C:\WINDOWS\SYSTEM, TotalSwapSpaceSize (empty), TotalVirtualMemorySize=2097148, TotalVisibleMemorySize=130516, Version=4.90.2514, and WindowsDirectory=C:\WINDOWS.

Rendered miscellaneous information includes OS Version=4.90.2514, and WMI Version=1164.0003.

Modem information which is rendered to the user via the interface component 330 comprises AnswerMode (empty), AttachedTo=COM3, Availability (empty), BlindOff=X4, BlindOn=X3, Caption=MT5634ZBA-USB Modem, CompatibilityFlags (empty), CompressionInfo (empty), CompressionOff=% C0, CompressionOn=% C1, ConfigManagerErrorCode (empty), ConfigManagerUserConfig (empty), ConfigurationDialog=modemui.dll, CountrySelected=United States of America, CreationClassName=Win32_PotsModem, Description=MT5634ZBA-USB Modem, DeviceID=USB\MULTIUSB\WDMMDM0, DeviceLoader=*vcomm, DeviceType=External Modem, DialType (empty), DriverDate (empty), ErrorCleared (empty), ErrorControlForced=\N4, ErrorControlInfo (empty), ErrorControlOff=\N1, ErrorControlOn=\N3, ErrorDescription (empty), FlowControlHard=&K3, FlowControlOff=&K0, FlowControlSoft=&K4, InactivityScale="3c000000", InactivityTimeout (empty), Index (empty), InstallDate (empty), LastErrorCode (empty), MaxBaudRateToPhone (empty), axBaudRateToSerialPort (empty), MaxNumberOfPasswords (empty), Model=MT5634ZBA-USB Modem, ModemInfPath=MDMLUC.INF, ModemInfSection=Modem2, ModulationBell=B1B16B2, ModulationCCITT=B0B15B2, ModulationScheme (empty), Name=Unimodem.vxd, PNPDeviceID=USB\MULTIUSB\WDMMDM0, PortSubClass="02", PowerManagementSupported (empty), Prefix=AT, ProviderName=Lucent, Pulse=P, Reset=AT&F, ResponsesKeyName (empty), RingsBeforeAnswer (empty), SpeakerModeDial=M1, SpeakerModeOff=M0, SpeakerModeOn=M2, SpeakerModeSetup=M3, SpeakerVolumeHigh=L3, SpeakerVolumeInfo (empty), SpeakerVolumeLow=L0, SpeakerVolumeMed=L2, Status=OK, StatusInfo=3, StringFormat (empty), SupportsCallback (empty), SupportsSynchronousConnect (empty), SystemCreationClassName=Win32_ComputerSystem, SystemName=COLUMBO-TEST, Terminator=, TimeOfLastReset (empty), Tone=T, and VoiceSwitchFeature (empty).

Network adapters information which is rendered to the user via the interface component 330 comprises Caption= [0003] Intel(R) PRO PCI Adapter, ArpAlwaysSourceRoute= (empty), ArpUseEtherSNAP=(empty), DeadGWDetectEnabled=(empty), Description=Intel(R) PRO PCI Adapter, MACAddress=00:D0:B7:1F:D7:29, ServiceName=(empty), DatabasePath=(empty), DefaultGateway=20.0.0.1, DefaultTOS=(empty), DefaultTTL=(empty), DHCPEnabled=TRUE, DHCPLeaseObtained=Mar. 9, 2000 12:09:21:, DHCPLeaseExpires=Mar. 9, 2000 12:12:21:, DHCPServer=10.0.0.4, DNSDomain=columbo.test.com, DNSDomainSuffixSearchOrder=(empty), DNSEnabledForWINSResolution=(empty), DNSHostName=COLUMBOTEST, DNSServerSearchOrder=, ForwardBufferMemory=(empty), GatewayCostMetric=(empty), IGMPLevel=(empty), IPAddress=10.0.0.193, IPFilterSecurityEnabled=(empty), IPPortSecurityEnabled=(empty), IPSecPermitIPProtocols=(empty), IPSecPermitTCPPorts=(empty), IPSecPermitUDPPorts=(empty), IPSubnet=255.255.255.0, IPUseZeroBroadcast=(empty), KeepAliveInterval=(empty), KeepAliveTime=(empty), MTU=(empty), NumForwardPackets=(empty), PMTUBHDetectEnabled=(empty), PMTUDiscoveryEnabled=(empty), TCPMaxConnectRetransmissions=(empty), TCPMaxDataRetransmissions=(empty), TCPNumConnections=(empty), TCPUseRFC1122UrgentPointer=(empty), TCPWindowSize=(empty), WINSEnableLMHostsLookup=(empty), WINSHostLookupFile=(empty), WINSPrimaryServer=10.0.0.11, WINSScopeID=(empty), WINSSecondaryServer=10.0.0.12, and IPXEnabled=(empty).

Reported information related to installed clients comprises Description=Client for Microsoft Networks, InstallDate=20000305160000.000000-480, Manufacturer=Microsoft, Name=Client for Microsoft Networks, and Status=OK. Test result information which is rendered to the user via the interface component 330 comprises items which may be tested by the network diagnostics tool according to the present invention, including services or parameters which may be tested, and which tests are used for that service or parameter. These include PING tests such as Loopback address, IP address(s) per adapter, Default Gateway(s) per adapter, DHCP server(s) per adapter, DNS server (s) per machine (This is a global parameter), WINS server(s) per adapter, Outlook Express Default Mail Server, Outlook Express Default News Server, and IE Proxy Server (Winsock Proxy is not detected). In addition, exemplary TCP connections tests may include Outlook Express Default Mail Server tests of the following ports: POP3 port 110, POP2 port 109, SMTP port 25, and IMAP port 143. Outlook Express Default News Server tests the NNTP port 119, and IE Proxy Server tests the TCP port that is configured in the IE proxy port settings.

As illustrated by the above listings, the diagnostic tool provides thorough diagnostic functionality to the user who merely launches the diagnostic component (e.g., component 28 of FIG. 1) by pressing a button (e.g., start activator component 302) in the interface component 330. The attribute information obtained by the diagnostic component is then rendered to the user via an easy to understand user interface (e.g., interface component 330) in a logically organized hierarchical manner. In addition, the attribute information may be saved to a file for archival purposes, or for transmission to technical support personnel. The inventors have found that such attribute information files are relatively small (e.g., 20 to 25 kbytes) in size, and are therefore easily adapted for storage on a floppy disk. Thus, where a network problem prevents the user from directly e-mailing such a file to a technical support person from the machine or system being tested, the file may be transported to a functional machine easily using a floppy disk.

The diagnostics tool may further provide for saving such attribute information files into a safe or protected portion of the system memory. For example, the files may be stored to a default directory which is protected from tampering (e.g., \windows\pchealth\helpctr\netdiag). Where multiple files are to be employed (e.g., such as where a user creates such files periodically), the tool may be adapted to give each such file a unique name, which may comprise, for example, descriptive information, such as time and date, so as to make the files easily identifiable and distinct (e.g., using a format such as 'netdiag(Day)(Month)(Year)(Hour)(Minute)(Seconds).htm'). As described above, such files may be compared, for example, to provide a technical support person with information about changes in a system configuration or performance over time. This information, in turn, may provide an indication of likely causes of problems being experienced in the computer system.

The network diagnostics tool of the present invention thus provides powerful diagnostic functionality to the user in combination with a centralized grouping of a large amount of useful information via the user interface component thereof. The tool answers many of the initial questions a support professional would ask when diagnosing a network problem. It saves valuable troubleshooting time (e.g. up to 30 to 45 minutes saved in the average technical support service call), and helps create a positive support experience for the consumer. For example, where a user is experiencing problems accessing network resources, a technical support person typically asks what the user is trying to reach, what the user's IP address is, whether the user is using WINS or DNS, whether the user can resolve names, and whether the user can resolve IP addresses. The diagnostics tool can expeditiously answer some or all of these questions in a short amount of time without the frustration experienced by users in the past.

Figure 10:
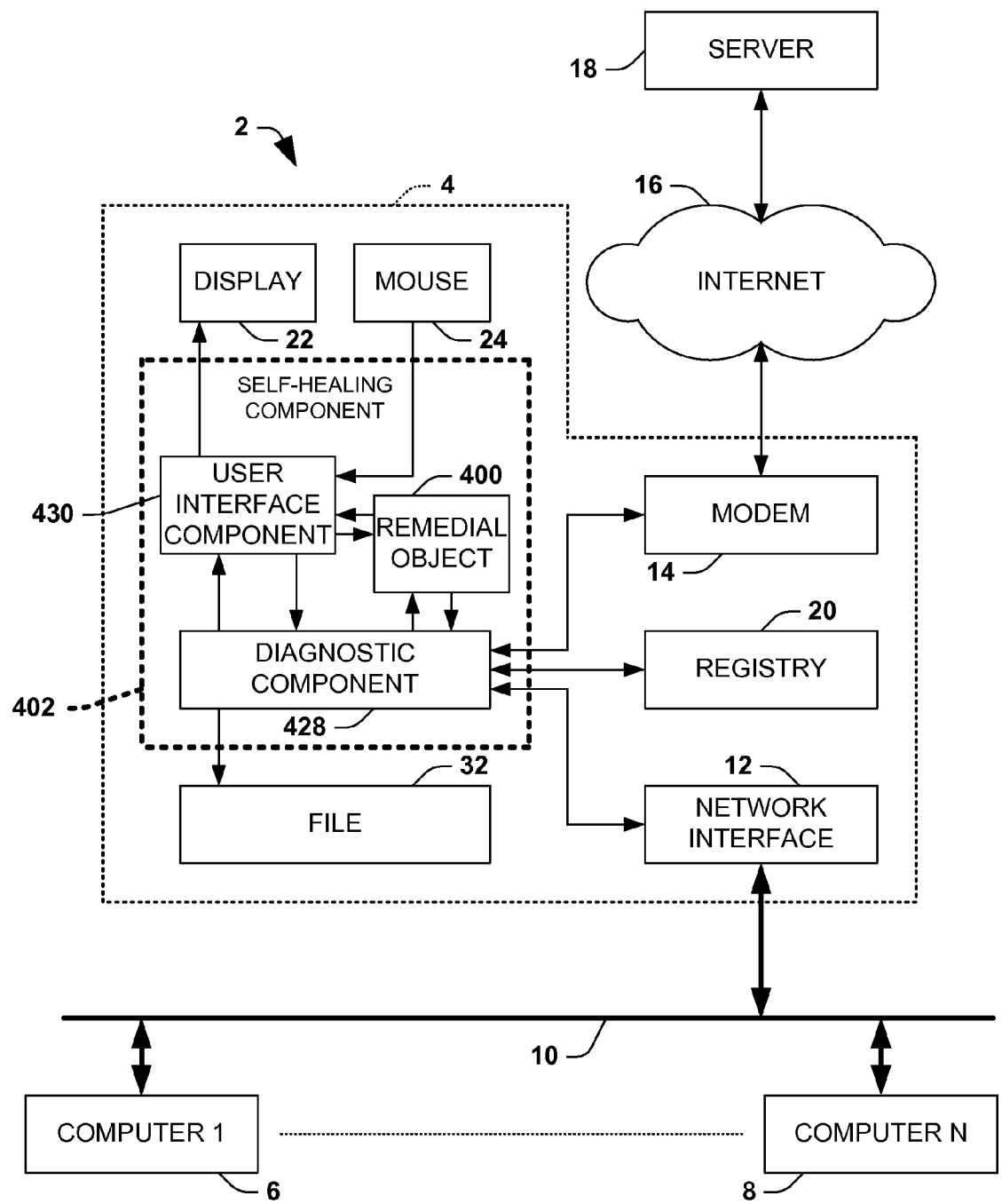
FIG. 10 is a schematic diagram illustrating an exemplary self-healing computer system in accordance with another aspect of the invention.

Referring now to FIG. 10, in addition to rendering attribute information to a user via a user interface, the diagnostic component 428 may be adapted to interact with a remedial component or object 400. The remedial object 400 and the diagnostic component 428 may be employed in a self-healing computer system 402. The diagnostic component 428 is adapted to determine at least one attribute associated with the computer system, as illustrated and described herein with respect to diagnostic component 28 of FIG. 1. The remedial object 400 is adapted to perform at least one remedial action according to the attribute information obtained by the diagnostic component 428. Thus, where a problem is detected by the diagnostic component 428, the remedial object 400 may attempt to fix the problem. The system may further comprise a user interface component 430 (e.g., graphical or otherwise), whereby a user may be notified that there is a problem, that it has been fixed, that attempts to fix the problem are underway, and/or that attempted fixes have failed. Thus, the system may be employed to identify and rectify problems without user intervention.

The remedial action may also comprise determining another attribute associated with the computer system. Thus, the remedial object 400 may initiate further testing or information gathering by the diagnostic component 428 according to the attribute information thusfar obtained. The testing via the diagnostic component 428 and the performance of remedial actions by the remedial object 400 may be iterated. For instance, the diagnostic component 400 may be further adapted to determine another attribute associated with the computer system after performance of a remedial action. Furthermore, the diagnostic component may be launched or actuated alternatively or in combination through detection of a problem or error (e.g., an application error), and/or via the user interface component 430.

Figure 11:
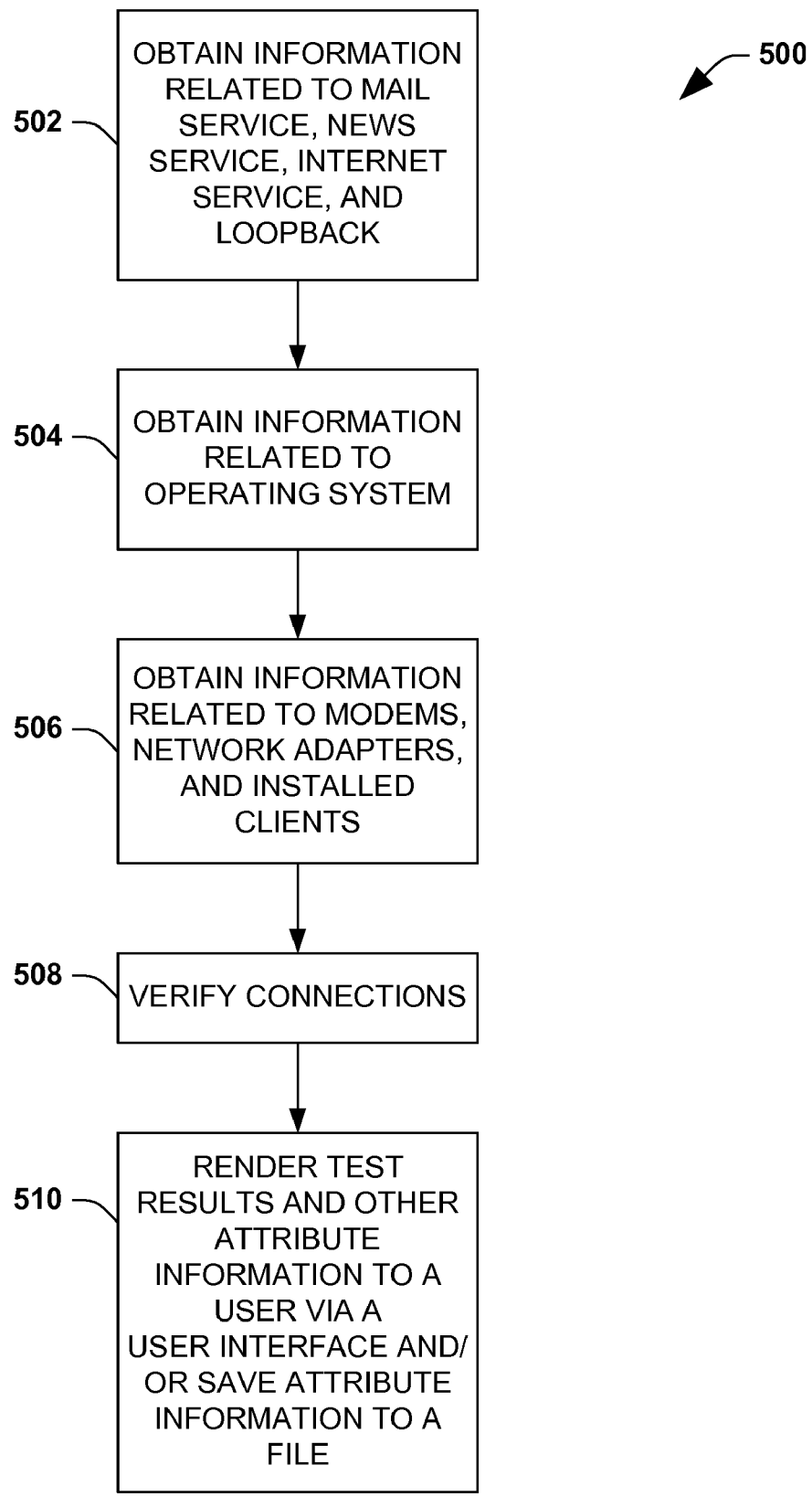
FIG. 11 is a flow diagram illustrating an exemplary method in accordance with another aspect of the invention.

In view of the structural, functional, and graphical features described above, methodologies in accordance with various aspects of the present invention will be better appreciated with reference to FIG. 11. Although the methodology of FIG. 11 is illustrated and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect the present invention.

Referring now to FIG. 11, an exemplary method 500 is illustrated for diagnosing problems in a networked computer system (e.g., system 2 of FIG. 1). The method 500 may be implemented using a software tool such as tool 26 illustrated and described above. However, it will be appreciated that the method 500 finds application in association with other tools and systems not specifically illustrated and/or described herein. The method 500 comprises determining at least one attribute associated with the computer system, and rendering the at least one attribute to a user. Beginning at step 502, information relating to mail service, news service, Internet service, and loopback is obtained. At step 504, information related to one or more operating systems associated with the computer system is obtained, and at step 506 information related to modems, network adapters, and installed clients is obtained. One or more connections are verified at step 508, after which the test results and other attribute information are rendered to a user via a user interface at step 510. Alternatively or in combination, the attribute information may be saved to a file associated with the computer system (e.g., file 32 of FIG. 1).

Thus, the method 500 obtains one or more sets of information and/or test results relating to the computer system, and provides these to the user. The attribute information may be grouped according to a logical or other hierarchy, such as illustrated in the exemplary user interface component 30 of FIGS. 1 and 3. Such groupings may comprise service information, operating system information, and modems and adapters information. The attribute information may be obtained, for example, by querying a data store, such as a system registry 20, and/or verifying a connection via PING or TCP diagnostic tests. Thus, the connectivity of the computer system may be verified at step 508 by sending out a packet and waiting for a response. In this manner, the method 500 may advantageously determine an IP address from the response, and/or determine whether a particular IP address is online.

Figure 12:
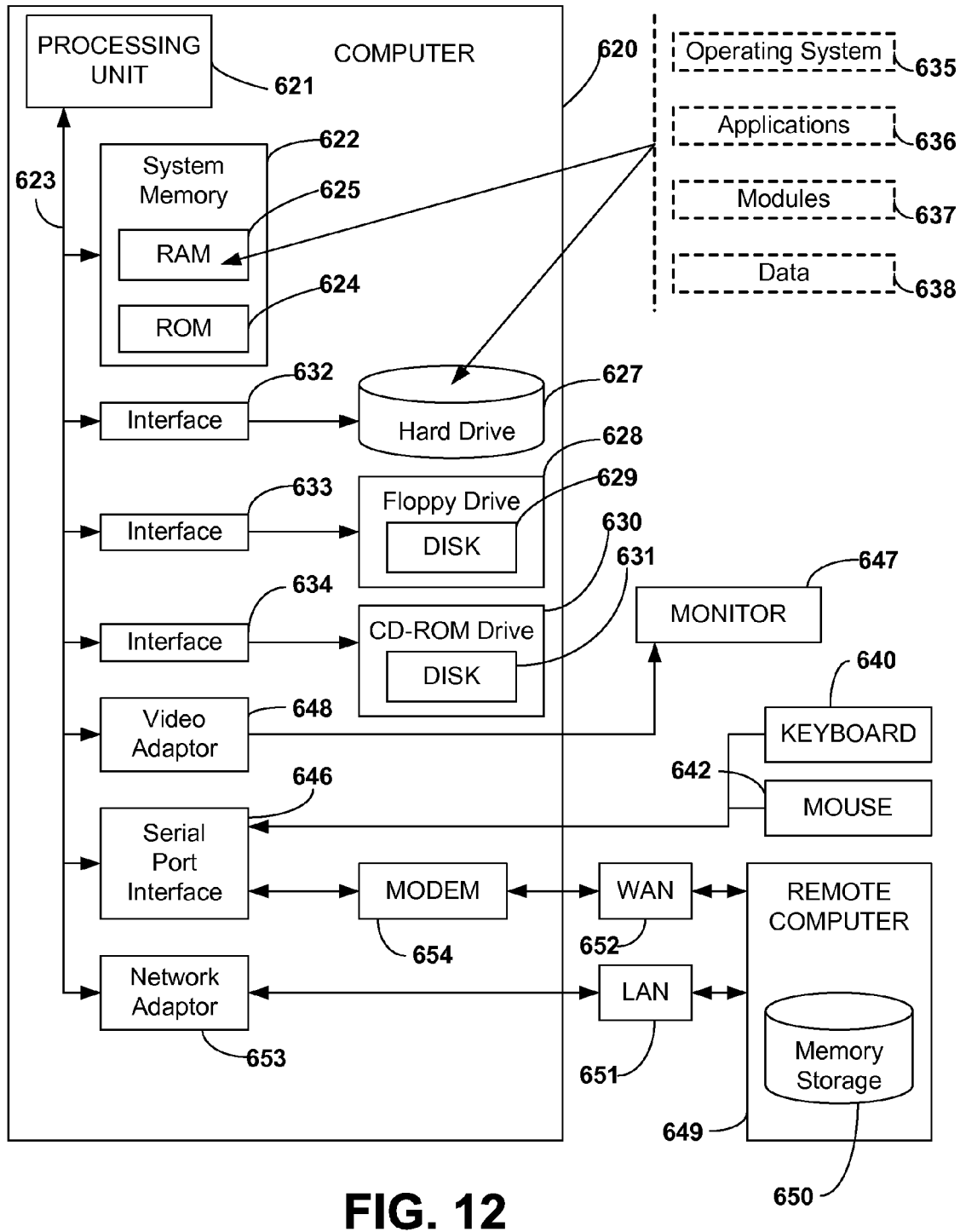
FIG. 12 is a schematic block diagram of an exemplary operating environment in which one or more aspects of the invention may be implemented.

In order to provide a context for the various aspects of the invention, FIG. 12 and the following discussion are intended to provide a brief, general description of a suitable computing environment in which the various aspects of the present invention may be implemented. While the invention has been described above in the general context of software tools and computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment for implementing various aspects of the invention includes a conventional personal or server computer 620, including a processing unit 621, a system memory 622, and a system bus 623 that couples various system components including the system memory to the processing unit 621. The processing unit 621 may be any of various commercially available processors. Dual microprocessors and other multi-processor architectures also can be used as the processing unit 621.

The system bus 623 may be any of several types of bus structure including a memory bus or memory controller, a peripheral bus, and a local bus using any of a variety of conventional bus architectures. The computer memory may include read only memory (ROM) 624 and random access memory (RAM) 625. A basic input/output system (BIOS), containing the basic routines that help to transfer information between elements within the computer 620, such as during start-up, is stored in ROM 624.

The computer 620 further includes a hard disk drive 627, a magnetic disk drive 628, e.g., to read from or write to a removable disk 629, and an optical disk drive 630, e.g., for reading a CD-ROM disk 631 or to read from or write to other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer-readable media provide nonvolatile storage of data, data structures, computer-executable instructions, etc. for the computer 620, including for the storage of broadcast programming in a suitable digital format.

Although the description of computer-readable media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention. A number of program modules may be stored in the drives and RAM 625, including an operating system 635, one or more application programs 636, other program modules 637, and program data 638.

A user may enter commands and information into the computer 620 through a keyboard 640 and a pointing device, such as a mouse 642. Other input devices (not shown) may include a microphone, an IR remote control, a joystick, a game pad, a satellite dish, a scanner, or the like. These and other input devices are often connected to the processing unit 621 through a serial port interface 646 that is coupled to the system bus 623, but may be connected by other interfaces, such as a parallel port, a game port, a universal serial bus ("USB"), an IR interface, etc. A monitor 647 or other type of display device is also connected to the system bus 623 via an interface, such as a video adapter 648. In addition to the monitor, a computer typically includes other peripheral output devices (not shown), such as speakers, printers etc.

The computer 620 may operate in a networked environment using logical connections to one or more remote computers, such as a remote computer(s) 649. The remote computer(s) 649 may be a workstation, a server computer, a router, a personal computer, microprocessor based entertainment appliance (e.g., a WebTV client system), a peer device or other common network node, and typically includes many or all of the elements described relative to the computer 620, although, for purposes of brevity, only a memory storage device 650 is illustrated. The logical connections depicted include a local area network (LAN) 651 and a wide area network (WAN) 652. Such networking environments are commonplace in offices, enterprise-wide computer networks, intranets and the Internet.

When used in a LAN networking environment, the computer 620 is connected to the local network 651 through a network interface or adapter 653. When used in a WAN networking environment, the computer 620 typically includes a modem 654, or is connected to a communications server on the LAN, or has other means for establishing communications over the WAN 652, such as the Internet. The modem 654, which may be internal or external, is connected to the system bus 623 via the serial port interface 646. In a networked environment, program modules depicted relative to the computer 620, or portions thereof, may be stored in the remote memory storage device 650. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention. As used in this application, the term "component" may refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A tool for diagnosing problems stored in a memory on a networked computer system, comprising the following computer executable components:
    an interface component that launches the software tool; and
    a diagnostic component associated with a local host computer in the networked computer system, wherein the diagnostic component obtains first information related to the local host computer from the data store of the host computer when the software tool is launched, selectively performs at least one test associated with the local host computer to obtain at least one test result according to the first information, and determines at least one attribute associated with the networked computer system according to at least one of the first information and the at least one test result, and wherein the software tool selectively provides the at least one attribute to at least one of a transferable file in the local host computer and the interface component.

2. The software tool of claim 1, wherein the software tool selectively provides the at least one attribute to the interface component, wherein the interface component renders the at least one attribute to a user, and wherein the at least one attribute comprises at least one of a first data set corresponding to services associated with the local host computer, a second data set corresponding to computer information, and a third data set corresponding to modems and network adapters associated with the local host computer.

3. The software tool of claim 2, wherein the first data set comprises information related to at least one of mail service, news service, Internet service, and loopback.

4. The software tool of claim 2, wherein the second data set comprises information related to an operating system.

5. The software tool of claim 2, wherein the third data set comprises information related to at least one of a modem, a network adapter and an installed client.

6. The software tool of claim 2, wherein the diagnostic component performs one of querying a data store and verifying a connection.

7. The software tool of claim 6, wherein the diagnostic component comprises a ping utility that tests a network by sending out a packet and waiting for a response.

8. The software tool of claim 7, wherein the ping utility determines whether a particular IP address is online.

9. The software tool of claim 7, wherein the ping utility determines an IP address from the response.

10. A method of diagnosing problems in a networked computer system, comprising:
    launching a diagnostic software tool using an interface component associated with the diagnostic software tool;
    automatically obtaining first information related to a local host computer in the networked computer system, wherein the first information is obtained from the data store of the host computer;
    selectively performing at least one test associated with the local host computer according to the first information;
    obtaining at least one test result associated with the at least one test;
    determining at least one attribute associated with the networked computer system according to at least one of the first information and the at least one test result; and selectively providing the at least one attribute to at least one of a transferable file associated with the local host computer and the interface component.

11. The method of claim 10, wherein selectively providing the at least one attribute to at least one of a transferable file associated with the local host computer and the interface component comprises providing the at least one attribute to the interface component, further comprising rendering the at least one attribute to a user using the interface component.

12. The method of claim 10, wherein selectively providing the at least one attribute to at least one of a transferable file associated with the local host computer and the interface component comprises providing the at least one attribute to a transferable file associated with the local host computer, further comprising sending the transferable file to another computer associated with the networked computer system.

13. The method of claim 10, wherein determining the at least one attribute associated with the networked computer system comprises obtaining a first data set comprising information related to at least one of mail service, news service, Internet service, and loopback.

14. The method of claim 10, wherein determining the at least one attribute associated with the networked computer system comprises obtaining a second data set comprising information related to an operating system.

15. The method of claim 10, wherein determining the at least one attribute associated with the networked computer system comprises obtaining a third data set comprising information related to at least one of a modem, a network adapter and an installed client.

16. The method of claim 10, wherein determining the at least one attribute associated with the networked computer system compnses one of querying a data store and verifying a connection.

17. The method of claim 16, wherein verifying a connection comprises sending out a packet and waiting for a response.

18. The method of claim 16, wherein verifying a connection comprises determining an IP address from the response.

19. The method of claim 16, wherein verifying a connection comprises determining whether a particular IP address is online.

20. A computer-readable medium having computer-executable instructions for:

launching a diagnostic software tool using an interface component associated with the diagnostic software tool;

automatically obtaining first information related to a local host computer in the networked computer system upon launching the diagnostic software tool, wherein the first information is obtained from the data store of the host computer;

selectively performing at least one test associated with the local host computer according to the first information;

obtaining at least one test result associated with the at least one test;

determining at least one attribute associated with the networked computer system according to at least one of the first information and the at least one test result; and selectively providing the at least one attribute to at least one of a transferable file associated with the local host computer and the interface component.

\* \* \* \* \*